(12) United States Patent
Couvet et al.

(10) Patent No.: US 9,061,189 B2
(45) Date of Patent: Jun. 23, 2015

(54) TRAINING DEVICE FOR RUGBY PLAYERS

(75) Inventors: Serge Couvet, Jouy le Moutier (FR);
Didier Retieres, Nuit Saint Georges (FR); Pierre Paul Vidal, Paris (FR); Julien Piscione, Ville d'Avray (FR)

(73) Assignee: THALES, Courbevoie (FR)

( * ) Notice: Subject to any disclaimer, the term of this patent is extended or adjusted under 35 U.S.C. 154(b) by 164 days.

(21) Appl. No.: 13/577,634

(22) PCT Filed: Feb. 9, 2011

(86) PCT No.: PCT/EP2011/051868
§ 371 (c)(1),
(2), (4) Date: Mar. 27, 2013

(87) PCT Pub. No.: WO2011/098469
PCT Pub. Date: Aug. 18, 2011

(65) Prior Publication Data
US 2013/0203030 A1    Aug. 8, 2013

(30) Foreign Application Priority Data
Feb. 9, 2010 (FR) .................................... 10 00524

(51) Int. Cl.
| A63B 69/34 | (2006.01) |
| A63B 69/00 | (2006.01) |
| A63B 24/00 | (2006.01) |
| G09B 19/00 | (2006.01) |
| G09B 9/00 | (2006.01) |
| A63B 21/008 | (2006.01) |

(52) U.S. Cl.
CPC ............. *A63B 69/00* (2013.01); *G09B 19/0038* (2013.01); *A63B 69/002* (2013.01); *G09B 9/00* (2013.01); *A63B 21/0087* (2013.01); *A63B 24/0003* (2013.01); *A63B 69/345* (2013.01); *A63B 2220/56* (2013.01); *A63B 2243/0066* (2013.01)

(58) Field of Classification Search
CPC .. G09B 19/22; G09B 19/038; A63B 24/0003; A63B 69/00; A63B 69/34; A63B 69/345; A63B 23/047
USPC .......................................................... 434/251
See application file for complete search history.

(56) References Cited

U.S. PATENT DOCUMENTS

| 5,489,168 | A  | *  | 2/1996  | Sheldon et al. ............... 409/235 |
| 6,240,799 | B1 |    | 6/2001  | Yau |
| 6,575,879 | B1 | *  | 6/2003  | Harney et al. ................... 482/54 |
| 7,892,154 | B1 | *  | 2/2011  | Alexa ............................ 482/112 |
| 2004/0144288 | A1 |  | 7/2004  | Chiang |
| 2004/0211284 | A1 | * | 10/2004 | Roy et al. ................... 74/490.01 |

(Continued)

FOREIGN PATENT DOCUMENTS

| FR | 2861313 A1 | 4/2005 |
| FR | 2892941 A1 | 5/2007 |
| WO | 2007/054564 A2 | 5/2007 |

*Primary Examiner* — Sam Yao
*Assistant Examiner* — Michael Humphrey
(74) *Attorney, Agent, or Firm* — Baker & Hostetler LLP

(57) ABSTRACT

A training device for rugby players, notably for a phase of the game known as the scrum, comprises: a simulation platform of the Stewart platform type, onto which a training yoke is mounted; an electronic device for closed-loop control of said simulation platform; a computer device for controlling the training device. The present invention is mainly applicable to the training, the development and the improvement of rugby players at a high level.

4 Claims, 4 Drawing Sheets

(56) References Cited

U.S. PATENT DOCUMENTS

| | | | |
|---|---|---|---|
| 2005/0162389 A1* | 7/2005 | Obermeyer et al. | 345/161 |
| 2010/0331150 A1* | 12/2010 | Patoglu | 482/79 |
| 2011/0306473 A1* | 12/2011 | Saglia et al. | 482/79 |
| 2012/0157244 A1* | 6/2012 | Staten et al. | 473/445 |

* cited by examiner

TRAINING DEVICE FOR RUGBY PLAYERS

CROSS-REFERENCE TO RELATED APPLICATIONS

This application is a National Stage of International patent application PCT/EP2011/051868, filed on Feb. 9, 2011, which claims priority to foreign French patent application No. FR 1000524, filed on Feb. 9, 2010, the disclosures of which are incorporated by reference in their entirety.

FIELD OF THE INVENTION

The present invention relates to a device for reproducing forces with six degrees of freedom, applied to the training of rugby players, notably during a phase of the game known as the 'scrum'. The present invention is mainly applicable to the development, the training, and the improvement of rugby players of all levels.

BACKGROUND

In a Game of Rugby, One of the Phases of the Game that is particularly dangerous is the scrum. This phase of the game demands a high individual and collective technical expertise, together with an excellent physical condition for the scrum participants. Indeed, the injuries occurring during this phase of the game can be very serious, in particular for the right prop and the hooker owing to the forces that come into play and to their position in the scrum.

In the practice of rugby, in order to train technically and physically for the scrum, the players have static equipment available comprising for example a head yoke, for three people, allowing a first row of opponents to be simulated notably by its function as an end stop. However, this equipment does not allow the players to be prepared to undergo strong displacement forces such as those developed for example during a non-regulation forward push of the opposing pack, when a scrum collapses. Moreover, these types of equipment are not active and can only reproduce, at the most, the energy supplied and stored by the players.

This type of missing aspect in the training of a player makes him all the more vulnerable during matches given that he must handle unusual forces that are not reproduced in training for fear of injuries.

Amongst the existing training systems, a first device is described in the patent application FR2892941. The first device is a training apparatus for rugby players that can perform a measurement of forces produced by said rugby players. The first device comprises a scrum yoke, mounted onto a base unit resting on the ground. The base unit and the yoke can effect a translation under the effect of the thrusting of the players on the yoke. In addition, the yoke is mounted so as to be mobile on the base unit in order to have a degree of freedom in rotation about a substantially vertical axis.

A second device described in the patent application FR 2861313 describes an apparatus designed for the muscular or technical preparation of an individual. The second device comprises a machine designed to be set on the ground, support means against which the two shoulders of the person under training can rest and linking means between the support means and the machine, said linking means allowing a translational movement along a substantially horizontal axis of the support means with respect to the machine. In addition, the linking means allow a degree of rotation for the support means about a substantially horizontal axis.

The existing training systems can only therefore produce two degrees of freedom, one degree in translation and one degree in rotation about a vertical axis. These devices are therefore not very well adapted to a precise and tactical training such as is demanded by the high level of the current game of rugby.

Moreover, the existing systems have jerky and abrupt movements that can even be dangerous for the players, due to the use of pneumatic actuators or tensioning systems. Moreover, some of these systems, only used in laboratories, do not correspond to the CE directives on safety, CE being a French acronym for "Conformité Européenne" [European Conformity].

SUMMARY OF THE INVENTION

One aim of the invention is notably to overcome the aforementioned drawbacks. For this purpose, the subject of the invention is a training device for rugby players. Said device notably comprises:
- a simulation platform, for example of the Stewart platform type, onto which a training yoke can be mounted;
- an electronic device for closed-loop control of said simulation platform;
- a digital device for controlling the training device.

The training yoke notably comprises yoke heads. Each yoke head can be connected to the simulation platform via a force sensor. The force sensors can supply measurements used for the closed-loop control of said simulation platform.

The measurements are notably transmitted to the computer control device for archiving and presentation to a coach for the players.

The computer device can supply means for programming training sequences comprising a series of commands for displacements of the platform. The series of commands can be transmitted to the electronic device for closed-loop control in order to mobilize the simulation platform.

The force sensors can measure forces and moments applied by the players to the yoke heads.

The computer device can comprise a device for driving the simulation platform in real time, said driving device being actuated by the coach.

The main advantages of the invention are notably that it allows:
- a manual control or an automatic control, by programming scenarios for the training device;
- safe and reliable movements, closed-loop controlled to the force on the yoke;
- measurements of forces and of moments produced by each yoke head;
- a recording of the measurements and their presentation in an ergonomic manner;
- a reproduction of forces exerted during a scrum by the opposing forwards.

BRIEF DESCRIPTION OF THE DRAWINGS

Other features and advantages of the invention will become apparent by means of the description that follows, presented by way of non-limiting illustration and with reference to the appended drawings which show.

DETAILED DESCRIPTION

Figure 1A:
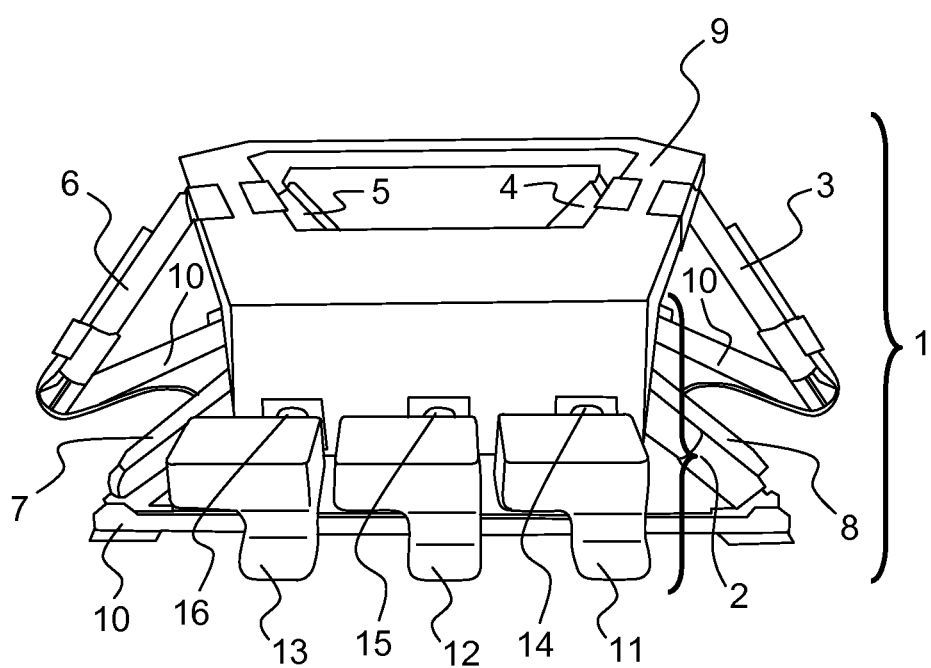
FIG. 1a: a first view of the simulation platform of the device according to the invention.
Figure 1B:
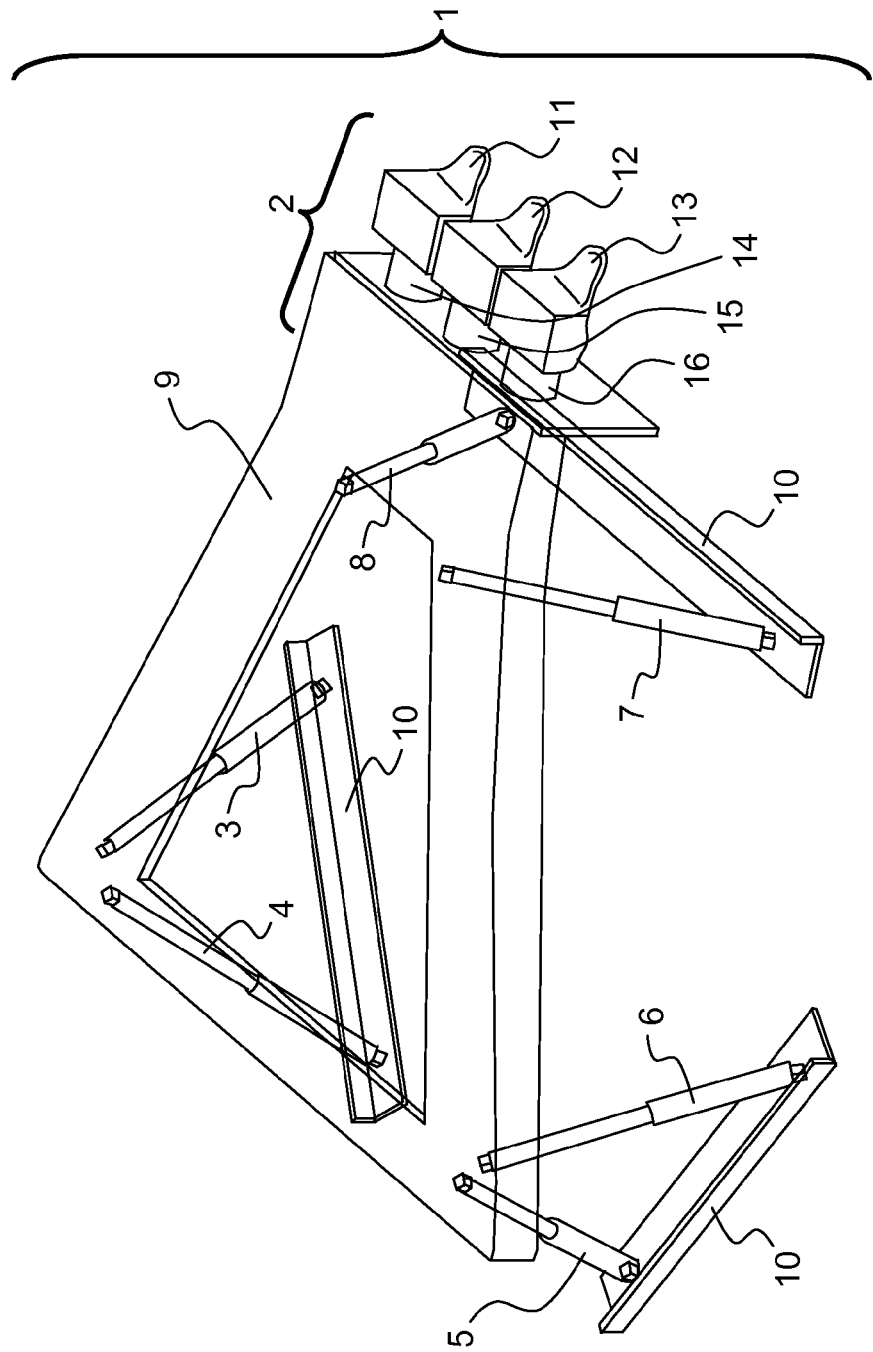
FIG. 1b: a second view of the simulation platform of the device according to the invention.

FIGS. 1a and 1b Show Two Different Views of a Simulation platform 1 according to the invention. The simulation platform 1 according to the invention is a device designed for the training of rugby players, notably used for training of the players for a scrum situation with an opposing team. Advantageously, the simulation platform 1 replaces the opposing team during the training. The simulation platform 1 produces a movement along six axes, adapted to the mobilization of a yoke 2 according to six degrees of freedom: three degrees of freedom in translation, and three degrees of freedom in rotation. Such a simulation platform is known by the name 'Stewart platform', or alternatively 'hexapod'. Advantageously, the use of a Stewart platform in the simulation platform 1 according to the invention accords it a high stability, and enables quick and accurate movements of the simulation platform 1.

The simulation platform 1 comprises six axes 3, 4, 5, 6, 7, 8. Each axis 3, 4, 5, 6, 7, 8 comprises an actuator which can take the form of an electrical linear drive. Each electrical linear drive can be actuated by a 'brushless' motor that advantageously runs with little noise. The simulation platform also comprises a pallet 9 composed of a metal plate. The pallet 9, shown in FIGS. 1a and 1b, can take the form of a polygon, each polygon being formed by metal side-members. The axes 3, 4, 5, 6, 7, 8 are connected in pairs by means of three first articulations, on the one hand, to the pallet 9 and, on the other, to a base unit 10. In FIGS. 1a and 1b, the base unit 10 is represented by three angle rails 10 onto which the axes 3, 4, 5, 6, 7, 8 are fixed by means of second articulations. Other embodiments of the base unit 10 may of course be envisioned, such as a single-piece metal plate. The angle rails 10 can be fixed onto a slab of a building for example. The yoke 2 comprises three yoke heads 11, 12, 13. Each yoke head 11, 12, 13 is mounted onto the pallet 9 via a force sensor 14, 15, 16. The yoke heads allow the three players of the first row to position their heads and shoulders in the yoke in order to apply a pushing force. The force sensors are notably used to measure the force applied by the three players of the first row of the scrum pack on the yoke 2. Conventionally, a pack comprises eight players distributed as three players on a first row, four players on a second row and one player on the last row. The force sensors also allow the closed-loop control of the actuators for moving the six axes 3, 4, 5, 6, 7, 8, as explained hereinafter. Placing the force sensors 14, 15, 16 as close as possible to the heads of the players with rigid yoke heads allows the training device to ensure the safety of the players using the device by, for example, imposing limits on the forces applied on the players. The rigidity of the heads allows the time delay between the forces actually applied on the player and the measurement of his effort exerted to be minimized.

Advantageously the use of such a platform according to the invention in the training device allows a robust and reliable training device to be made available. Indeed, the use of this type of platform 1 has been approved for many years in devices for the training of helicopter and aircraft pilots.

Figure 2:
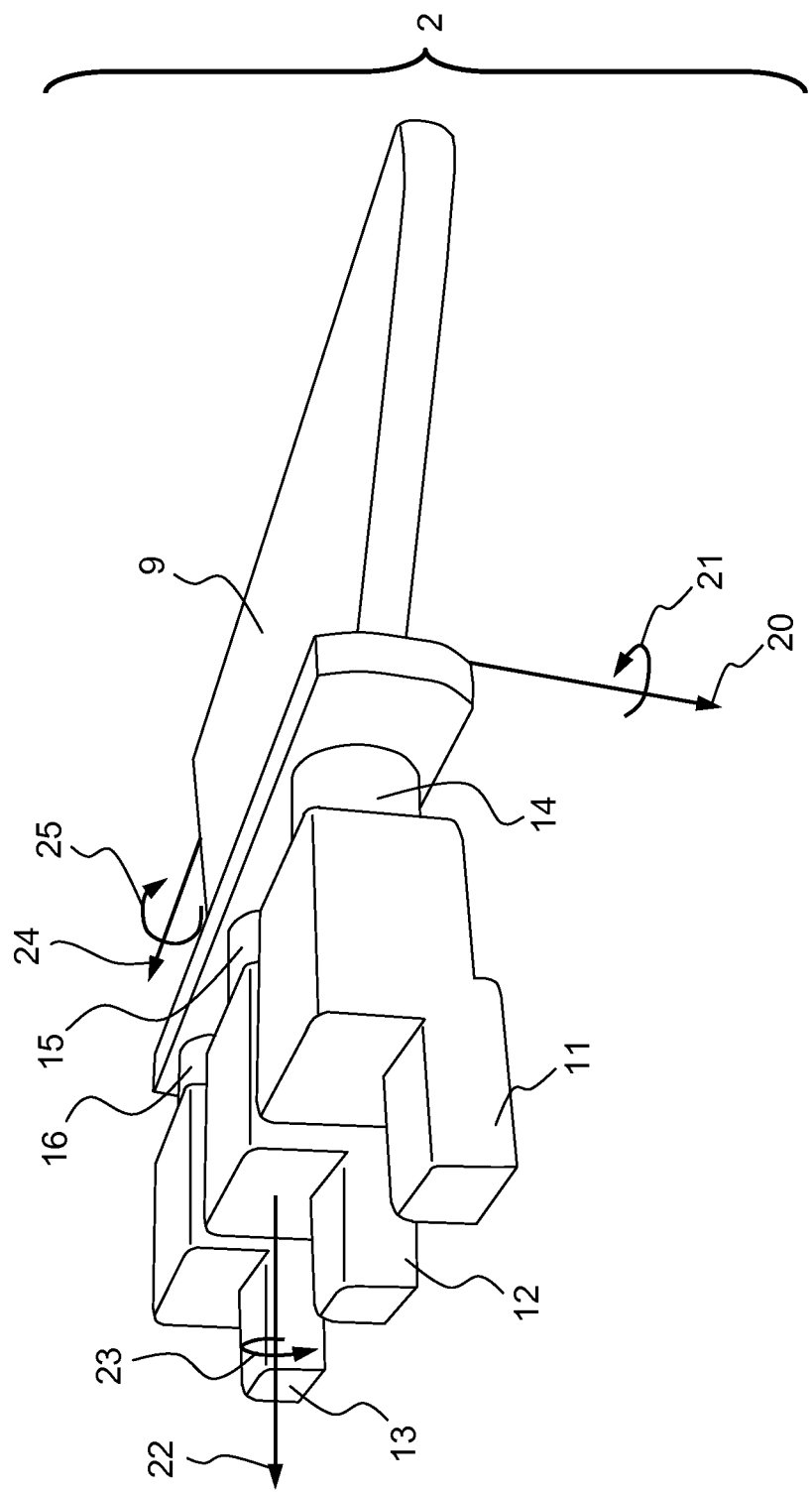
FIG. 2: the training device according to the invention.

FIG. 2 shows the yoke 2 of the training device 1 according to the invention. In FIG. 2, the various possible movements of the yoke 2 are shown, according to various degrees of freedom, during the operation of the simulation platform according to the invention 1. A first degree of freedom in translation is provided along a first axis 20 substantially perpendicular to the pallet 9. A first degree of freedom in rotation is notably provided by a first rotation 21 about the first axis 20. A second degree of freedom in translation is notably provided, by the platform 1, along a second axis 22 substantially perpendicular to the first axis 20 and co-linear with a straight line passing through a central axis of a motion sensor 14, 15, 16. A second degree of freedom in rotation 23 is provided by the platform 1 about the second axis 22. A third degree of freedom in translation 24 is provided by the platform 1, along a third axis 24 substantially perpendicular to the first axis 20 and to the second axis 22. A third degree of freedom in rotation is provided about the third axis 24.

Figure 3:
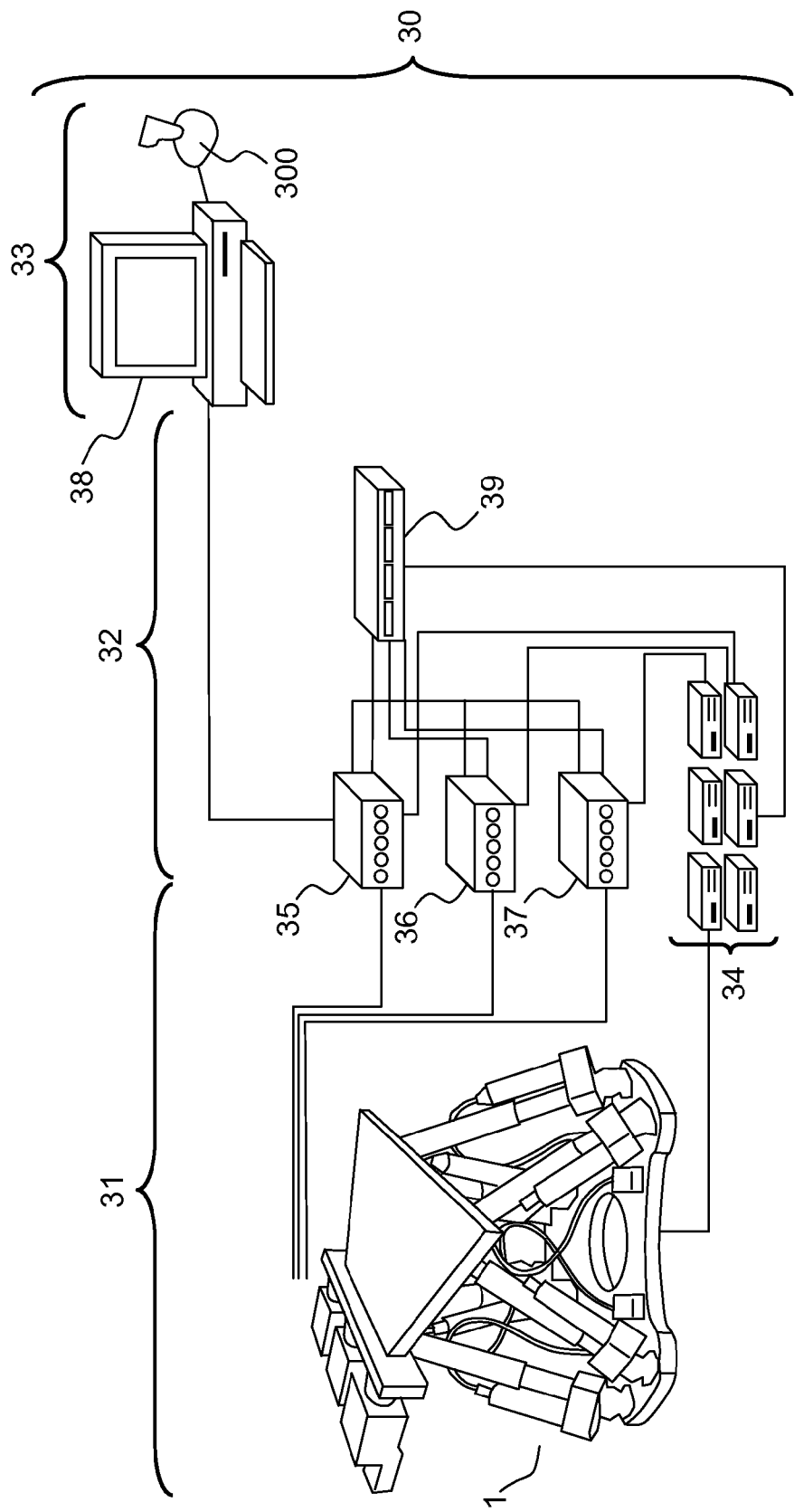
FIG. 3: the degrees of freedom of the yoke of the simulation platform according to the invention.

FIG. 3 shows schematically one example of an architecture 30 of the training device according to the invention. The architecture 30 shown in FIG. 3 comprises three separate parts 31, 32, 33.

A first part 31 is a mechanical part comprising the simulation platform 1 according to the invention.

A second part 32 of the device according to the invention is an electronic part 32. The electronic part 32 notably comprises six vari-speed drives 34. Each vari-speed drive 34 is connected to an actuator for an axis 3, 4, 5, 6, 7, 8 shown in FIGS. 1a and 1b. The vari-speed drives 34 control the speed of the motors of each actuator. The power regulators are connected to three electronic boards 35, 36, 37. The electronic boards 35, 36, 37 send commands to a closed-loop control for the actuators, in other words for their extension and their speed. The electronic boards 35, 36, 37 also acquire the information coming from the force sensors 14, 15, 16. The information coming from the force sensors, in other words the forces applied on the heads of the players, is amplified by the electronic boards prior to being transmitted to a computer 38. The electronic part also comprises an electrical power supply 39 for powering the electronic boards 35, 36, 37 and the vari-speed drives 34 with suitable voltages and currents.

A third part 33 of the device 30 according to the invention is a digital part 33. A computer 38 allows the measurements from the force sensors 14, 15, 16 to be stored in a database. The measurements can thus be analyzed by a coach following a training session for example. The measurements, in other words the forces and the moments exerted by the players, can also be displayed in real time on a dedicated man-machine interface running on the computer 38. The computer 38 can also comprise a software package for controlling the simulation platform 1. The control software allows the simulation platform 1 to be controlled in all its degrees of freedom, with a response analogous to that of a scrum pack of opponents. The control software may itself be controlled via a man-machine interface allowing training sequences to be pre-programmed. For example, it is possible to simulate automatically either simple movements of the scrum, such as a rotation or a translation, or combinations of movements of rotation and translation. The control software can also be driven in real time by a coach by means of a 'joystick' 300 for example.

Advantageously, it is thus possible to set up the training device for a reduced-power operation with the aim of teaching tactical skills and/or an understanding of risky situations.

The device according to the invention may also use a theoretical modeling of a scrum composed of opposing players, for which are notably available an estimation or measurements: of geometrical parameters, of parameters on inertia, of power characteristics, in order to produce training phases.

Another possible application of the device according to the invention is to connect remotely two devices according to the invention situated in two separate places and training two different teams in real time. The first device records the forces and the moments applied by the players of the first team on the first device. The first device transmits the measurements to the second device which, depending on these measurements, re-transmits the forces and the moments to the second team by means of the second device. It is also possible, for example, for two teams of different levels to apply a reducer coefficient to the forces and the moments applied by the second device. Advantageously, the system according to the invention can then allows two teams of the same level or of different levels to train remotely from one another and together. The device according to the invention then acts as a force transformer between the two scrum packs.

The device according to the invention allows the movements of a scrum composed of opposing players to be reproduced in order to establish training scenarios. The training scenarios can be generated by, for example, programming specific tactical scenarios, or a specific configuration for preparation of a match.

Advantageously, said device can be used over a network in order to undertake a remote training for two teams, said devices reproducing the efforts exerted by each of the teams against the opposing team.

The device according to the invention advantageously allows an ergonomic and dynamic yoke to be provided for a row of forwards in a rugby team, notably comprising a right prop, a hooker and a left prop. In addition, the device according to the invention allows forces, speeds and movements to be reproduced according to six degrees of freedom as in a real scrum.

The invention claimed is:

1. A training device for rugby players that simulates rugby scrums, comprising:
   a simulation platform of the Stewart platform type, onto which a training yoke is mounted;
   an electronic device for closed-loop control of said simulation platform;
   a computer having a processor and data storage and software controlling the training device;
   said training yoke comprising yoke heads, each yoke head being connected to the simulation platform via a force sensor, said force sensor supplying measurements used for the closed-loop control of said simulation platform; said measurements being transmitted to said computer which archives the measurements and presents the measurements to a coach for the players,
   wherein the simulation platform is configured to allow the training yoke to move according to six degrees of freedom, including three degrees of freedom in translation and three degrees of freedom in rotation; and
   said closed-loop control moves the simulation platform to provide resistive force and torque feedback in the said six degrees of freedom through the training yoke to the player.

2. The training device as claimed in claim 1, wherein the computer supplies a series of commands for displacements of the simulation platform, said series of commands being transmitted to the electronic device for closed-loop control in order to mobilize the simulation platform.

3. The training device as claimed in claim 1, wherein said force sensors measure forces and moments applied by the players to the yoke heads.

4. The training device as claimed in claim 1, wherein the computer further comprises a device for driving the simulation platform in real time, said driving device being actuated by the coach.

* * * * *